Figures 1, 2, 3, 4, 5:
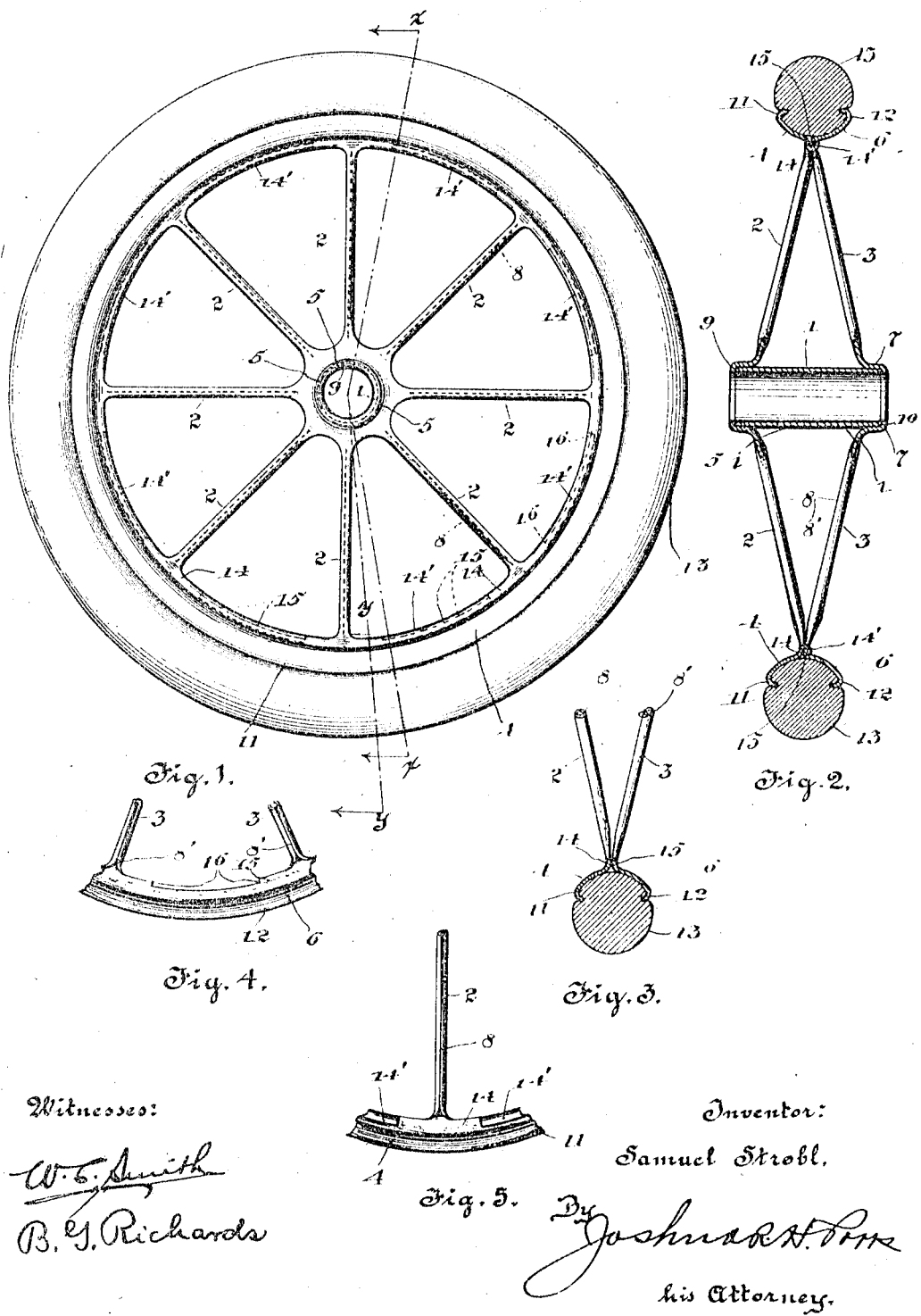

S. STROBL.
METALLIC WHEEL.
APPLICATION FILED JUNE 22, 1909.

965,492.

Patented July 26, 1910.

Witnesses:
W. E. Smith
B. G. Richards

Inventor:
Samuel Strobl.
By Joshua R. H. Potts
his Attorney.

UNITED STATES PATENT OFFICE.

SAMUEL STROBL, OF CHICAGO, ILLINOIS.

METALLIC WHEEL.

965,492.

Specification of Letters Patent.  Patented July 26, 1910.

Application filed June 22, 1909. Serial No. 503,728.

*To all whom it may concern:*

Be it known that I, SAMUEL STROBL, a citizen of the United States, residing at Chicago, county of Cook, and State of Illinois, have invented certain new and useful Improvements in Metallic Wheels, of which the following is a specification.

My invention relates to improvements in wheels, and more particularly to metallic wheels adapted for use on go-carts, cycles, automobiles or other vehicles, the object of the invention being to provide such wheels of great strength and light weight and at a low cost of manufacture.

A further object of my invention is to provide such a design that the spokes and rim of the wheel may be struck up from sheet metal, the rim to be so formed as to readily receive a rubber tire.

Other objects will appear hereinafter.

With these objects in view my invention consists in the novel construction and arrangement of parts which will be hereinafter fully described and more particularly pointed out in the appended claims.

My invention further consists in a modified form of wheel which possesses features in common with the preferred form.

My invention will be more readily understood by reference to the accompanying drawings forming a part of this specification and in which, Figure 1 is a side elevation of my improved wheel in its preferred form, Fig. 2 is a section thereof taken on line $x$—$x$ of Fig. 1, Fig. 3 is a detail section taken on the line $y$—$y$ of Fig. 1, Fig. 4 is a detail side elevation showing a portion of the outside of the inner rim portion, and Fig. 5 is a detail side elevation showing the inside of the outer rim portion.

Referring now to the drawings 1 designates the tubular hub of the wheel, 2 the outer spokes and 3 the inner spokes. The spokes 2 and the outer half of the rim 4, together with the hub sleeve 5 are struck up from a single blank of sheet metal, and the spokes 3, the inner half of the rim 6, and the hub sleeves 7 are similarly formed. The body portion of each spoke is pressed into a tubular form, the contiguous edges 8 of the spokes 2 being on the inside thereof, and similar edges 8' of the spokes 3 being on the outside thereof, causing the wheel to present a neater appearance than if these joints were less concealed from view. Moreover spokes formed in this manner are stiff and strong, and their surfaces are such that the same may be readily cleaned or painted.

The sleeves 5 and 7 are provided with inwardly extending flanges 9 and 10 respectively to engage the ends of the hub 1, which effectually hold the latter in position. The rim portions 4 and 6 are preferably provided with inwardly extending flanges 11 and 12 respectively to clench the sides of the rubber tire 13, whereby the latter is held rigidly in position.

In order to hold the rim portions 4 and 6 together when the wheel is assembled, abutting flanges 14 and 15 are formed in said portions respectively, the outer flanges 14 having projections 14' which are bent over the inner flange 15 as shown in Fig. 2.

It will be noted that the inner flange 15 is cut away at 16 so after the projections 14' are bent into position, the adjacent surfaces as shown in Fig. 1 are flush, an exceptionally neat construction being the result. This construction also locks the rims against circumferential slipping and the projections 14' constituting short portions of the arc are easily bent.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having described my invention what I claim as new and desire to secure by Letters Patent is:

1. A metallic wheel comprising a cylindrical metallic hub; oppositely disposed sets of converging tubular spokes, each set being formed from a sheet of metal provided with means for engaging said hub; rim sections carried by the outer ends of said spokes; and abutting flanges on the inner edges of said rim sections, one of said flanges being provided with extended securing lips bent over the other flange, said other flange being notched to receive said lips, substantially as described.

2. A metallic wheel comprising a cylindrical metallic hub consisting of a continuous metallic tube; oppositely disposed sets of converging tubular spokes, each set being formed from a sheet of metal having a shallow outwardly extending sleeve at its center, said sleeve being provided with an inwardly extending flange at its outer end tightly fitting over the corresponding end of said hub, rim sections carried by the outer ends of said spokes; and abutting flanges on the inner edges of said rim sections, the outer of said flanges being provided with extending securing lips bent over the inner flange and of a length shorter than the distance between two spokes, said inner flange being notched to receive said lips, substantially as described.

In testimony whereof I have signed my name to this specification in the presence of two subscribing witnesses.

SAMUEL STROBL.

Witnesses:
ARTHUR A. OLSON,
HELEN F. LILLIS.